Patented Sept. 14, 1943

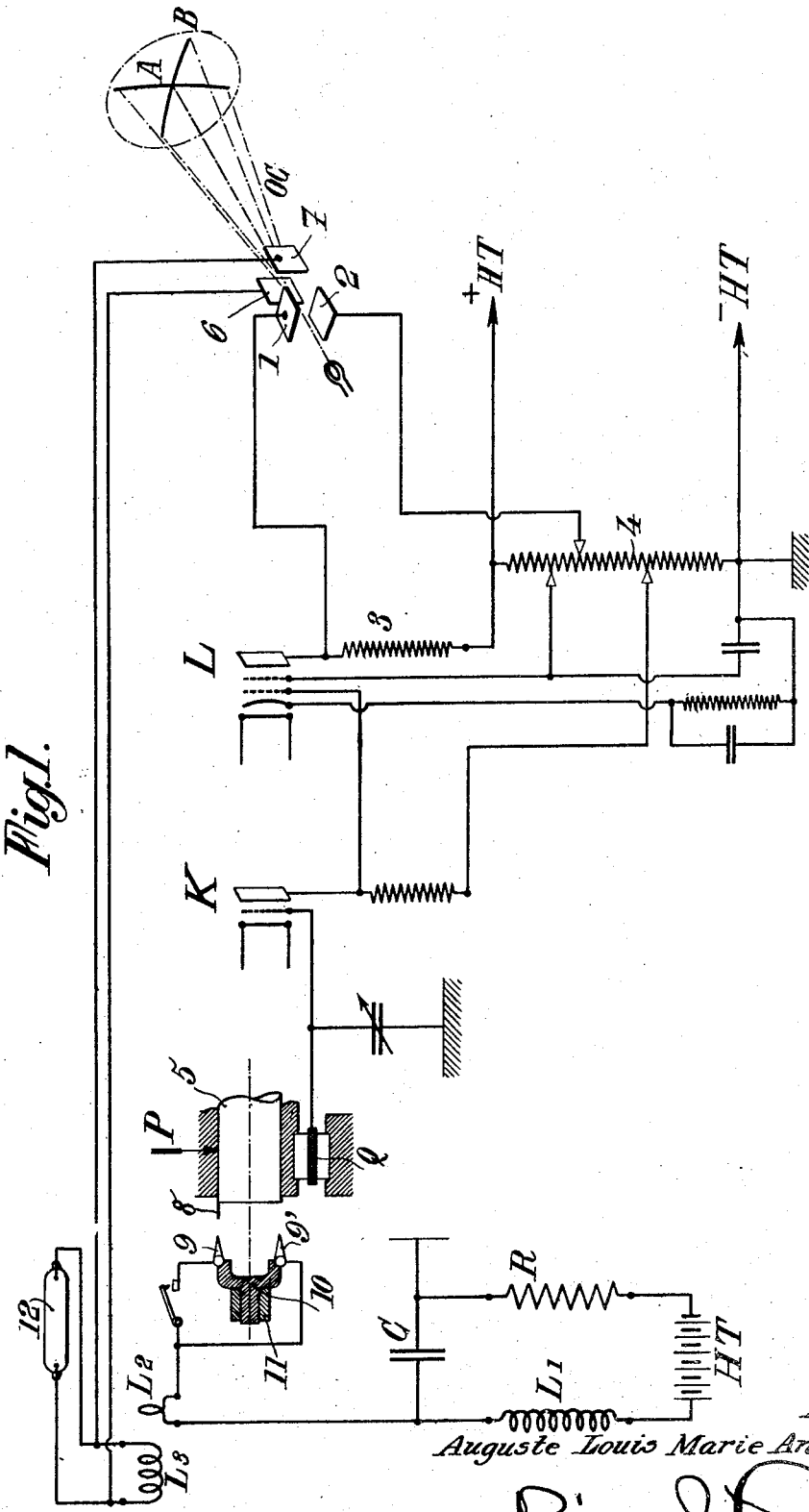

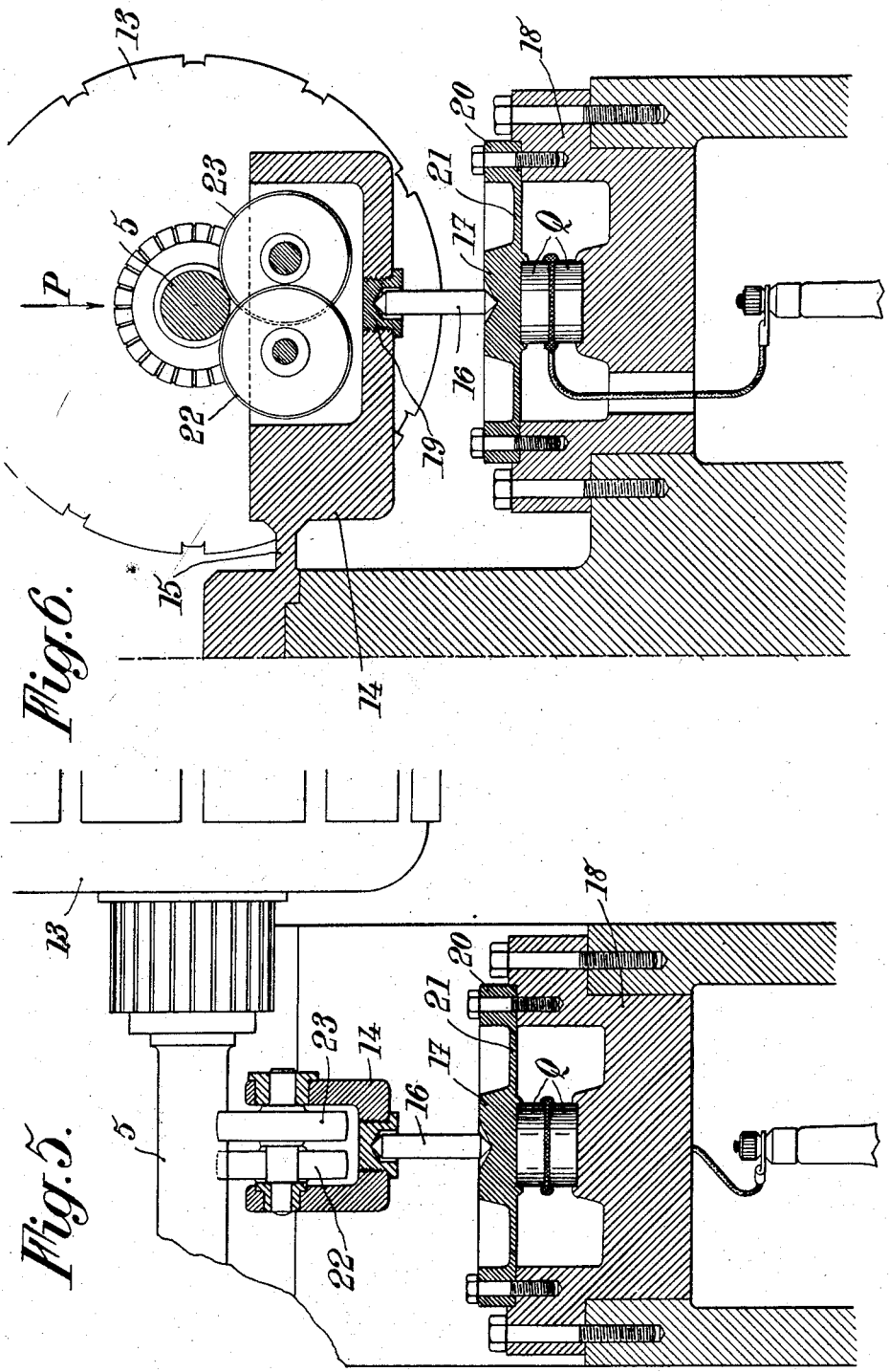

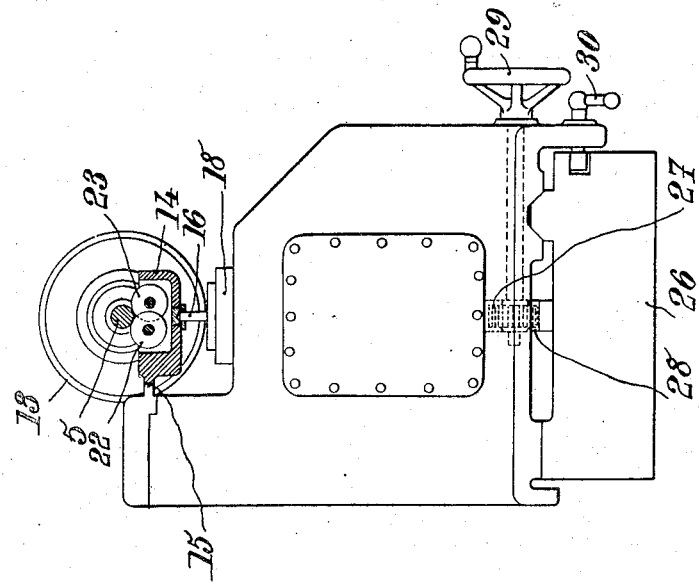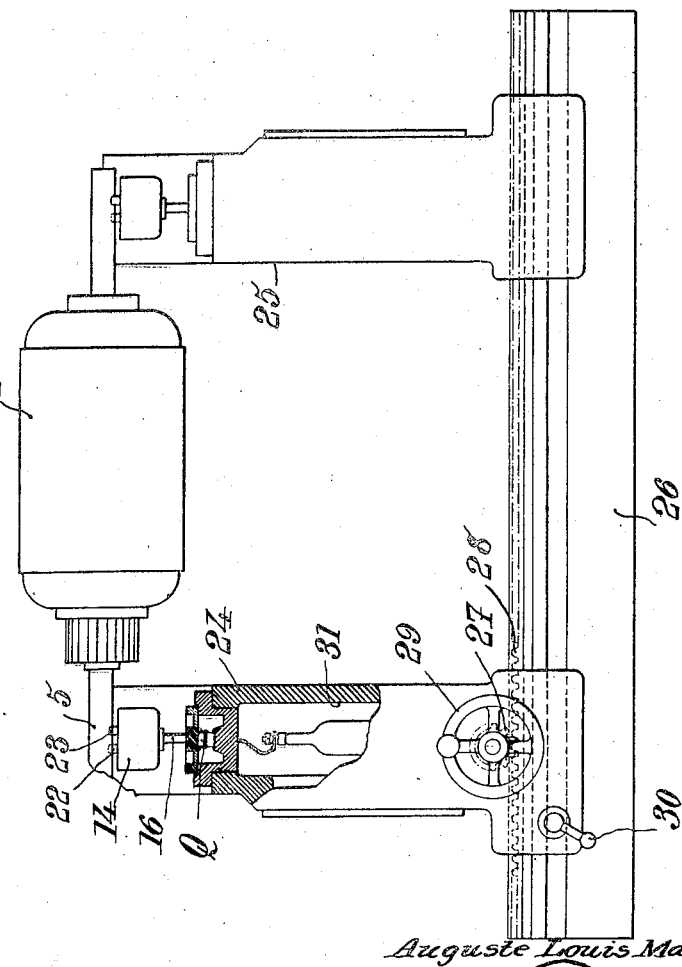

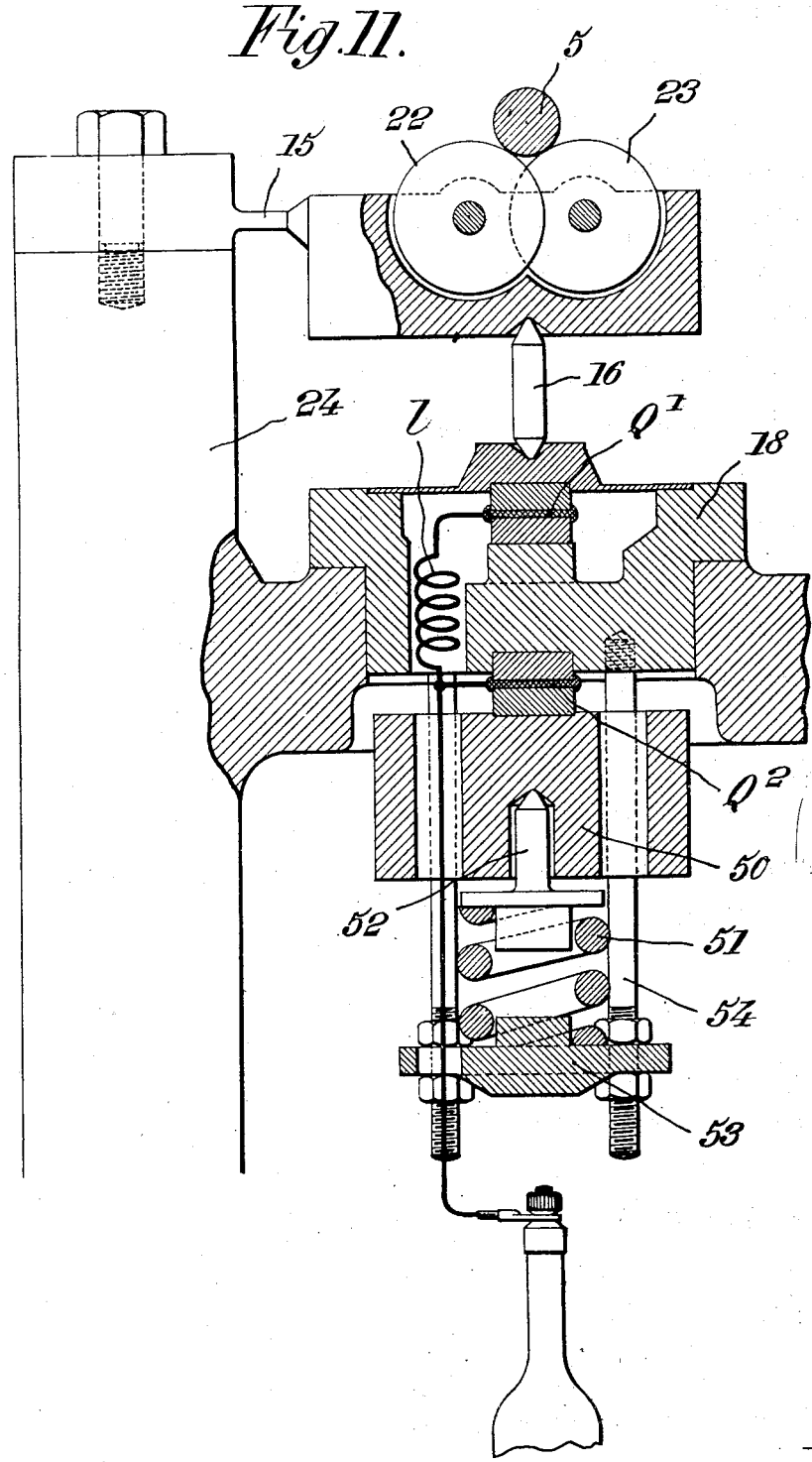

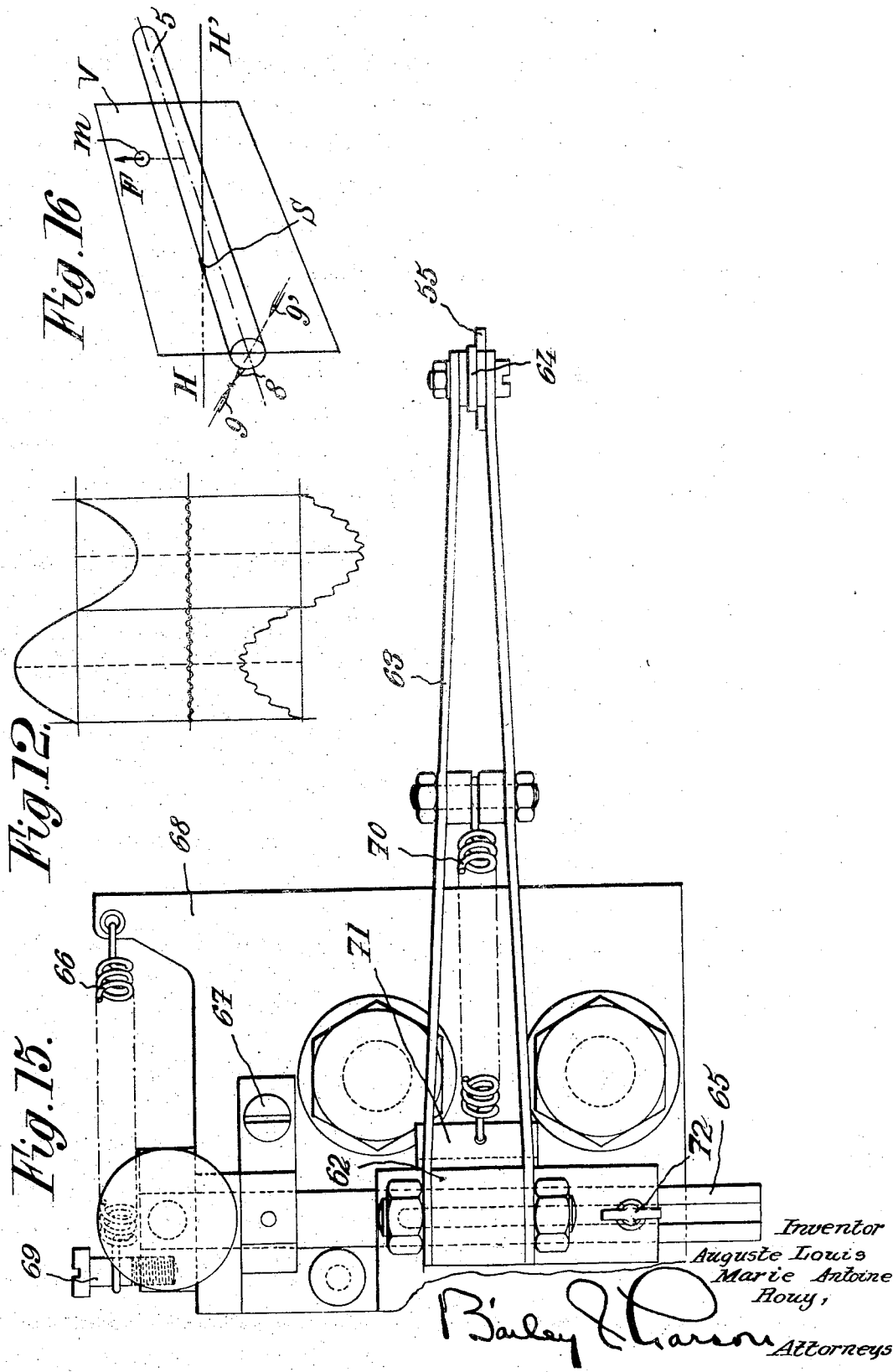

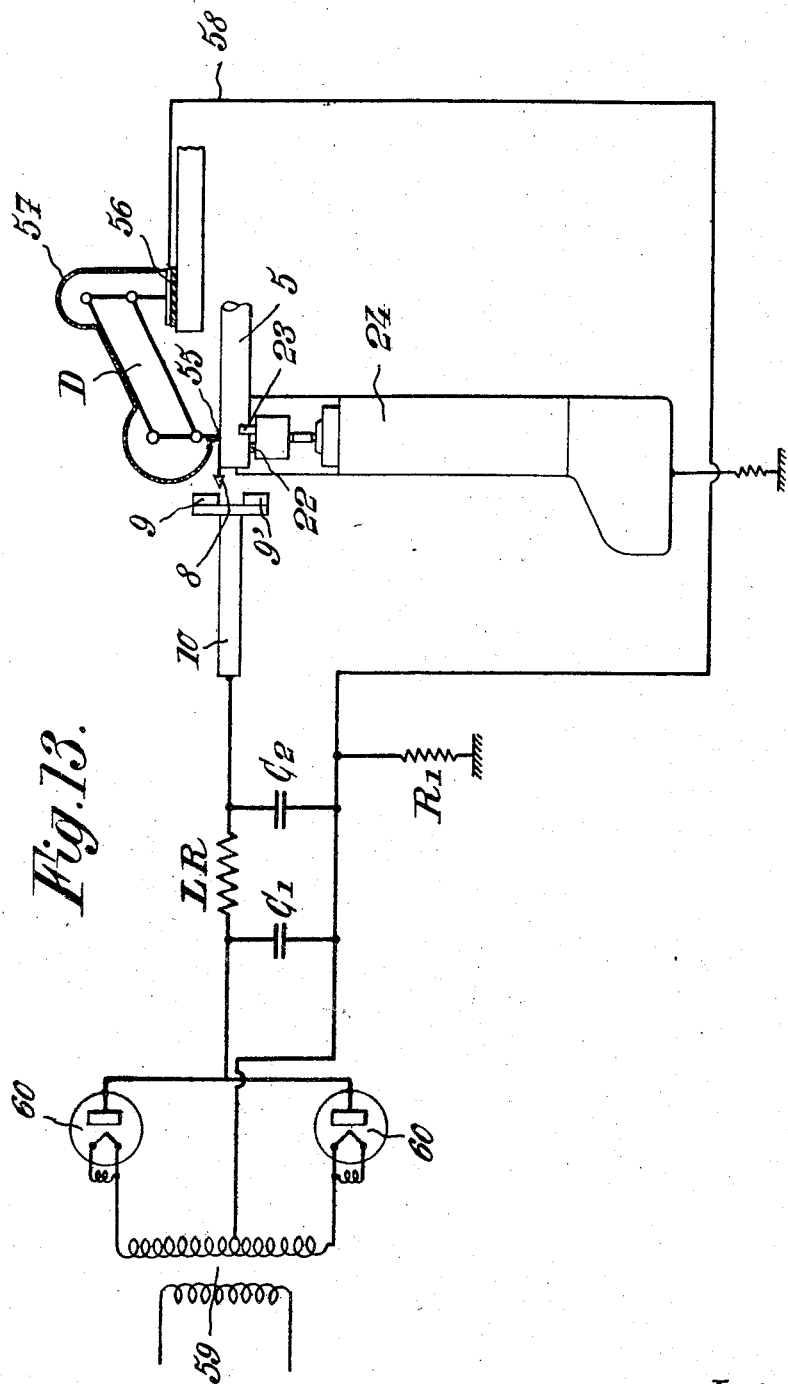

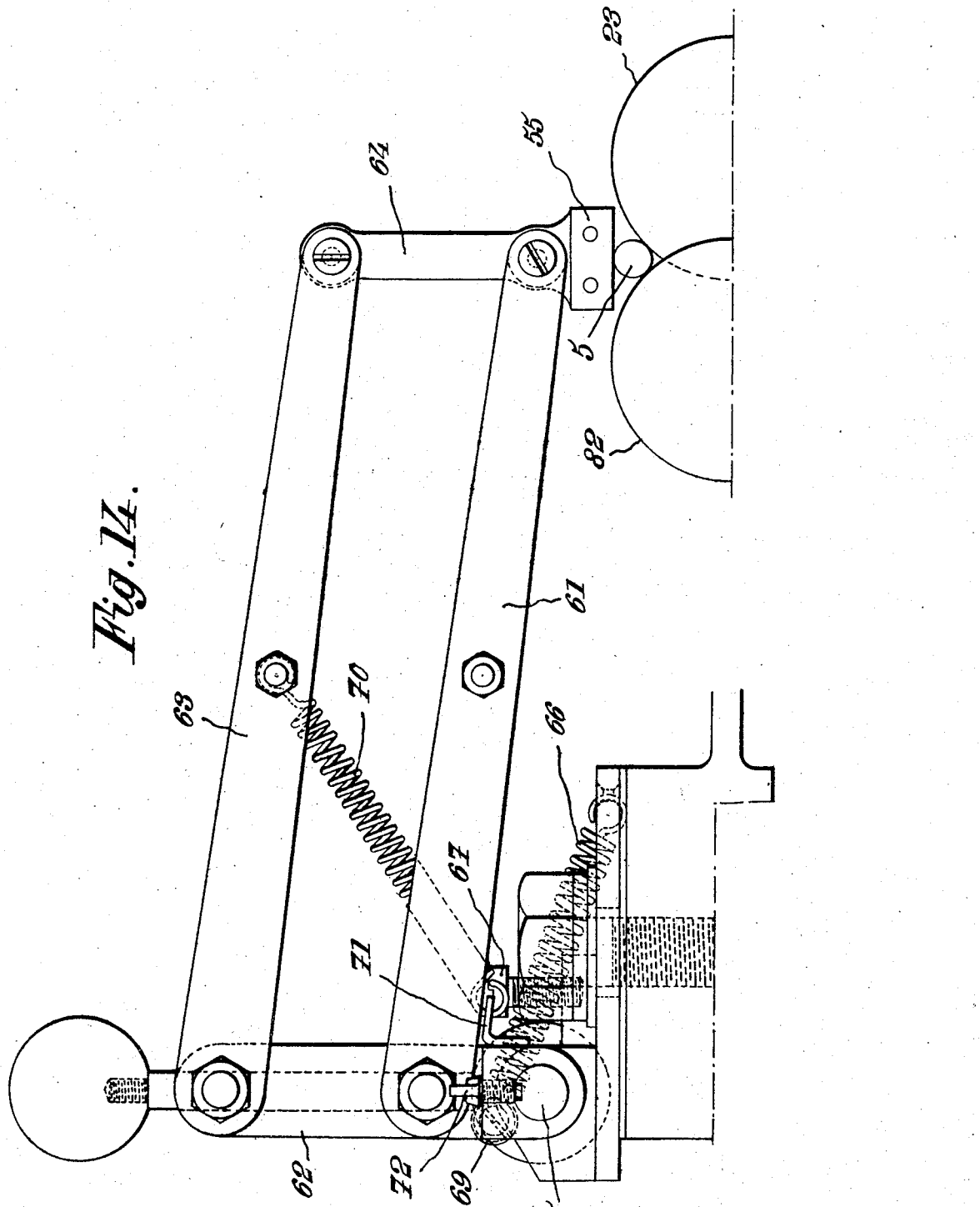

2,329,654

UNITED STATES PATENT OFFICE 2,329,654

MEASURING OR DETECTING PERIODIC FORCES

Auguste Louis Marie Antoine Rouy, Paris, France, assignor to Gyro-Balance Corporation, Greenwich, Conn., a corporation of Delaware Application April 7, 1939, Serial No. 266,714
In Luxemburg April 15, 1938

26 Claims. (Cl. 73—53)

The present invention relates to dynamic balancing apparatus for measuring or detecting periodic unbalancing forces of a rotating body, such as, for instance, the rotors of electric machines, shafts or rotary parts of motors, with a view to ensuring the balancing thereof.

Among the objects of the invention is an improved system for determining the characteristics of unbalancing regions of a rotating body that is to be dynamically balanced, characterized by the fact that the bearing structure on which the rotary body rotates forms part of a substantially rigid mechano-electric transducing structure, of the piezo-electric type, for instance, arranged so that the periodical mechanical unbalance forces which may be produced by the mechanical lack of balance of the rotary parts, or any other cause of unbalancing, shall be transmitted to the transducing structure for producing corresponding periodical unbalance potential cycles, while substantially preventing movement of the bearing structure and other parts of said supporting structure.

The foregoing and other objects of the invention will be best understood from the following description of exemplifications thereof, reference being had to the accompanying drawings wherein:

Fig. 1 is a diagrammatical view of an electric arrangement for carrying out the system according to the present invention for determining the position of the unbalanced masses on a shaft or rotor, said arrangement being made according to the invention;

Fig. 5 is an elevational view of a device for transmitting to piezo-electric devices the periodic forces resulting from the presence of unbalanced masses on a rotary shaft, according to the invention, portions of this device being shown in section;

Fig. 6 is a side view of the arrangement illustrated by Fig. 5;

Fig. 7 is an elevational view, with portions in section, of an apparatus for balancing shafts or rotors, this apparatus being made according to the invention;

Fig. 8 is a side view of the arrangement illustrated by Fig. 7;

Fig. 11 is a sectional view of a portion of a device for studying the lack of balance of a rotary piece, including means for detecting parasitic vibrations;

Fig. 12 illustrates, in the form of curves, the variations of the efforts transmitted to the piezoelectric devices;

Fig. 13 is a diagrammatical view of an apparatus for detecting the unbalancing of rotary pieces, according to the present invention;

Fig. 14 is an elevational view of certain devices included in the arrangement of Fig. 13, according to the invention;

Fig. 15 is a partial view corresponding to Fig. 14;

Finally, Fig. 16 diagrammatically illustrates the operation of the system illustrated by the above mentioned Fig. 13.

As above stated, the present invention is especially concerned with the balancing of rotating shafts, and in particular the rotors of electric machines but, of course, it should be well understood that the invention is not limited to this application.

The unbalance of a rotating body manifests itself by periodic unbalance forces exerted by the rotating body on its supporting bearing and supporting base structure, during each revolution of the rotating body.

In prior practical balancing systems, the rotating body has been combined with its supporting base structure into a system which has a resonance frequency near to or below the frequency of the unbalancing forces, in order to take advantage of their relative vibratory motion for actuating the unbalance determining means, such as mechano-electric transducing elements utilized to determine the location and magnitude of the unbalance. In such prior balancing systems, the inertia forces of the rotating body and the other parts of the system affect the determination of the magnitude and the angular location of the periodic unbalance forces, making it necessary to accurately calibrate the vibratory amplitude of the system for each particular sample of rotor that is to be balanced at each speed at which it is to be balanced. This is required because different rotors of different masses or different mass distributions will produce in such prior systems different inertia forces which are superposed on the unbalancing forces, the location and magnitude of which is being determined.

According to an essential feature of the present invention, the bearing structure on which the rotary body rotates forms part of a substantially rigid supporting structure including a substantially rigid mechano-electric transducing structure, of the piezo-electric type, for instance, arranged so that the periodical mechanical unbalance forces which may be produced by the mechanical lack of balance of the rotary parts, or any other cause of unbalancing, shall be transmitted to the transducing structure for producing corresponding periodical unbalance potential cycles, while substantially preventing movement of the bearing structure and other parts of said supporting structure.

It is, for instance, possible, owing to such an arrangement, which is capable of many practical embodiments, to obtain, in an oscillograph, a spot which moves as a function both of the frequency of the force to be measured, that is to say of the speed of revolution of the shaft to be studied, and of the variable amplitude of the component which is being recorded.

Figure 4:
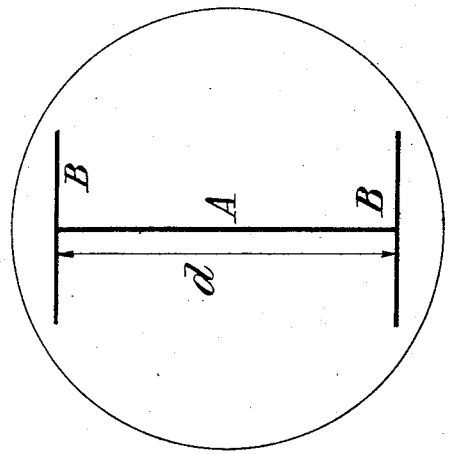
Figs. 3 and 4 are other diagrams illustrating the working of the arrangement according to the present invention.

If, as it is convenient to do in the case of the application that is being considered, I proceed in such manner as to indicate, for instance, in the transverse planes of the respective bearings, the vertical components of the unbalanced masses, I obtain, in the cathode-ray oscillograph, for a given bearing, a straight line A (Fig. 1) which, as soon as the speed of revolution of the shaft exceeds a given value, seems to be continuous and is of a length $d$ which (Fig. 4) corresponds to the degree of unbalance, as far as this bearing is considered.

Then, in order angularly to determine the lack of balance, according to another feature of the present invention, I provide means capable of producing, in the cathodic oscillograph, not only a first signal such as A, indicating the degree of unbalance that is considered, but also another signal B capable of determining the position of the shaft when the component of the unbalancing action passes through a predetermined value, and especially the maximum value thereof.

For this purpose, supposing that there are provided suitable transmission means (such as those which will be more specifically described hereinafter) for applying to a substantially rigid mechano-electric transducing element, such as a piezo-electric quartz element Q (Fig. 1), or to any other similar device, the vertical component P produced by an unbalanced mass $m$ corresponding to a force F (Figs. 1 and 3), I employ, for obtaining, in the oscillograph OC, at least two signals such as those above specified, an arrangement such as the following:

Concerning first the means corresponding to signal A, they are, for instance, designed in such manner that the voltage of the piezo-electric device Q is transmitted, after suitable amplification, to two of the plates of oscillograph OC, this amplification being obtained in any suitable manner, for instance through one or several electronic tubes such as K and L (Fig. 1).

In Fig. 1, the voltage of the piezo-electric device is applied to the grid of a three electrode electron tube K which acts as a measuring amplifier tube, and its output is then amplified in a second tube L. I then apply to the plates 1 and 2 of the oscillograph voltage provided in the plate circuit of this tube L, for instance across the terminals of a resistance 3, preferably with a variable connection to a potentiometer 4 inserted between the high and low tensions.

Such a system completely reproduces the variations of component P. This is due to the fact that the piezo-electric transducing device has practically no delay and, on the other hand, the natural frequency of the system averages 120,000 cycles per second, being thus perfectly capable of cooperating with cyclic phenomena the frequency of which can hardly be higher than 4,000 cycles per second.

Concerning now the means corresponding to signal B, they are for instance arranged in such manner that this signal can be transverse to the first signal, and has a position variable with respect thereto, this position being adjustable by means of a control device adapted to be displaced angularly with respect to the shaft to be studied.

Preferably, two signals B are emitted for every revolution of shaft 5, which corresponds to one signal for every half-revolution.

Figure 2:
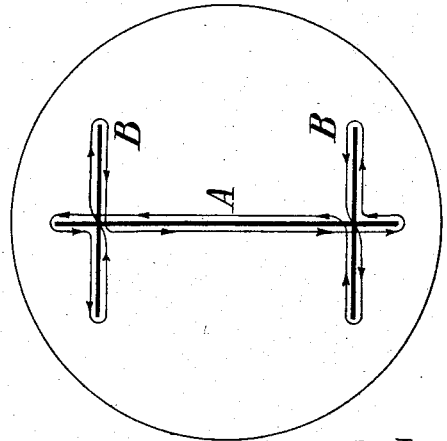
Fig. 2 is a diagram illustrating the operation of the electrical arrangement according to the invention as shown by Fig. 1.

It is thus possible easily to determine the position of the radial plane containing the unbalanced mass by calculating the angle through which said control device is to be turned for bringing both of the signals B (which occupy, in an initial position of said device, positions such as illustrated by Fig. 2) to come at the ends of straight line A. These signals B are then emitted when force P passes through its maximum value, as it will be hereinafter explained.

These signals B will be, for instance, obtained by means of a discharge applied between the two plates 6, 7 of the oscillograph, these discharges being extremely rapid in such manner as to give, on the screen, the appearance of a luminous line.

For this purpose, I make use, for instance, of an oscillating circuit (Fig. 1) including a reactance coil $L_1$, a resistance R, and a capacity C, with a high tension source HT, said circuit being adapted to be discharged through said control device, which is then made, for instance, as follows:

This control device includes a system of adjustable contacts adapted to be closed twice for every revolution of shaft, and it includes, in the embodiment illustrated by the drawings:

a. On the one hand, a very light metallic needle 8, arranged to revolve together with the shaft in question; and, b. On the other hand, two points 9 and 9', carried by an insulating piece 10, capable of assuming various angular positions by being suitably displaced by the operator, the whole preferably in combination with a graduated scale not shown by the drawings.

Every time the circuit is closed by needle 8 and one of said points, the condenser discharges through coil $L_2$, thus inducing a current in coil $L_3$, the latter being connected with plates 6, 7, in such manner that there is produced, at this time, a very quick deviation of the light spot, producing a luminous line.

In Fig. 2, I have shown the path of the trace of the light spot on the screen of the oscillograph. The persistency of the luminous impressions gives the impression of two straight lines B transverse with respect to line A, and disposed on either side of the middle thereof.

Of course, the oscillating circuit is arranged in such manner as to ensure a transverse movement of the light spot which is sufficiently quick. For instance, it will be adjusted with a frequency of 100,000 cycles per second. For such a frequency, the angular movement corresponding to the transverse displacement would be, for a speed of revolution of the shaft of 3000 revolutions per minute, of:

$$\frac{50 \times 360}{100,000} = \frac{18}{100}$$

of a degree, that is to say 10.8 minutes.

The needle 8 above mentioned might be replaced by any other suitable part.

Finally, it should be well understood that other indicating or marking means (capable, eventually, of replacing those above mentioned) might be provided. For instance, I have shown at 12, a neon tube which ensures the stroboscopic determination of the unbalancing on the shaft or rotor itself.

Figure 3:
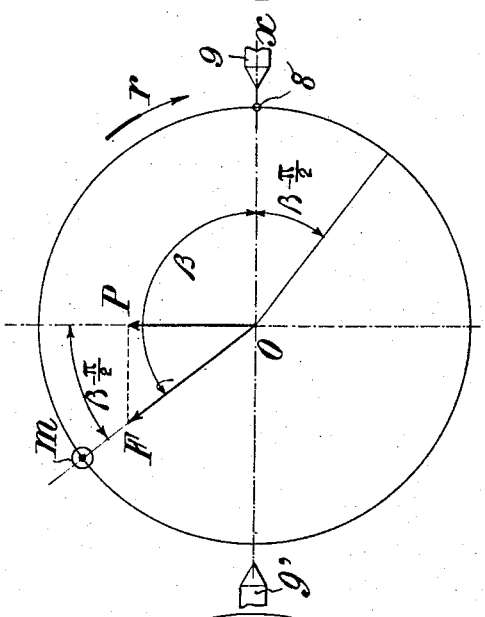

Whatever be the specific arrangement that is chosen, I obtain a device which works in the following manner:

When the control device is in its initial position, such as that diagrammatically shown in Fig. 3, by the position of the points 9 and 9' above mentioned, disposed along axis Ox, I obtain, for instance, on the oscillograph screen, the image of Fig. 2.

This image corresponds, actually, to an angular position of the unbalanced mass $m$ which makes an angle $\beta$ with Ox. This angle is to be measured, according to the invention.

Now, if points 9 and 9' are caused to turn in direction $r$ (by acting upon knob 11), there comes a time when both of the lines B are located at the ends of straight line A. This indicates that lines B are produced when force P passes through its maximum value, that is to say when the unbalanced mass $m$ passes through a vertical line, or in other words to F being equal to P.

In order to obtain this new image, the points have been turned through the angle $$\beta - \frac{\pi}{2}.$$

which gives the value of angle $\beta$.

It will be readily understood that the system above described is extremely simple and makes it possible to obtain a remarkable accuracy of the balancing operations on shafts of all kinds employed in connection with motors, rotors of electric machines, and so on.

The device according to the present invention can be employed merely as above described, or it may include other features capable, in some cases, of being used separately.

One of these features concerns the means for making it possible, in systems of the kind above described, to transmit to a piezo-electric device the efforts transmitted to the bearing or another equivalent part of a machine, and it consists in arranging said means in such manner that they permit the transmission substantially of the component of said pressure in a given direction only.

For instance, as shown by Figs. 5 and 6 (which are supposed to relate to the case of the balancing of the shaft 5 of a rotor 13) the means in question include the following elements:

a. On the one hand, a support 14 with respect to which shaft 5 is journalled and which is connected to the whole of the measurement or equivalent apparatus in such manner that this support can undergo displacements in the vertical direction. For this purpose, I make use, for instance, of a flexible connection 15 which, while permitting said vertical displacements, opposes, by compression, displacements in the horizontal direction; and, b. On the other hand, an element of transmission between support 14 and the quartz transducing element Q, this element being such that it permits of transmitting solely the vertical component P, while however permitting small displacements along the other axes, but this without producing variations of the stresses exerted on the quartz.

For instance, according to the present invention, this transmission element is constituted by a kind of leg 16 the ends of which (preferably of substantially conical shape) are housed on the one hand in the plate 17 of a box 18 containing the piezo-electric device, and, on the other hand, in a small part 19, made for instance of hard steel, carried by the bottom of support 14.

Such an arrangement complies with the conditions above mentioned, and, of course, both element 16 and plate 17 (and also the bottom of box 18) are arranged in such manner as to be able to have a resistance to compression which is as perfect as practically possible.

It will be seen from the foregoing that in the balancing system of the invention, the bearing structure on which the rotary body rotates forms part of a substantially rigid supporting structure including a substantially rigid mechano-electric transducing structure, such as a piezo-electric transducing structure, interposed between the bearing structure and the base structure and arranged so as to be subjected to the periodical transducer actuating unbalance forces transmitted by the rotary body to the base structure for producing corresponding unbalance potential cycles while substantially preventing movement of said bearing structure relative to said base structure. Such operating conditions are made possible by providing the supporting structure with substantially rigid elements for transmitting the transducer actuating unbalance forces in the direction from the bearing structure to the transducer structure and therefrom to the base structure, and with structural elements extending in a direction lateral to the direction of the transducer actuating unbalance forces and arranged to prevent movement of the bearing structure in said lateral direction, while permitting the transmission of the unbalance forces to the transducing structure.

In other words, as distinguished from the prior art practice, in the balancing system of the invention, the elements of the mechano-electric transducing structure have such high rigidity and are so combined with other rigid elements of its supporting structure, that the system which they form with the rotary body and the base has a resonance frequency of a sufficiently higher order than the frequency of the unbalance forces as to substantially prevent vibratory motion between the bearing structure and the base structure while subjecting the transducer structure to the direct action of the unbalance forces transmitted by the rotary body to the base structure.

Plate 17, which serves to distribute the pressure on quartz element Q, is preferably provided, in its central part, with a thick portion, connected to a peripheral annular portion 20 through a thin portion 21 having a certain elasticity.

Furthermore, this arrangement has a high natural frequency, averaging, for instance, 1200 cycles per second, whereby it would be necessary to rotate shaft 5 at a speed exceeding 5000 revolutions per minute with the risk of resonance.

Concerning the way in which shaft 5 is mounted on support 14, it includes, preferably, according to another feature of the present invention, rollers 22, 23, capable of running freely about their axes carried by support 14, these rollers being adapted to receive shaft 5.

Such an arrangement is advantageous because it permits of easily changing the rotors or other parts to be balanced.

These operations are further facilitated, according to another feature of the invention, if use is made of a balancing apparatus arranged in such manner as to include at least two pedestals, intended to receive the ends of the shafts of the rotors or other pieces to be balanced, said pedestals being adapted to be adjusted at a variable interval from each other.

In Figs. 7 and 8, I have shown a part of a mechanical supporting structure of an apparatus of this kind, including two hollow pedestals 24, 25, mounted on a general support 26 through a sliding supporting means. One of these pedestals is, for instance, stationary while the other is movable, through a pinion driving device, including a pinion 27 and a rack 28, the whole being controlled through a wheel 29 and including locking means 30.

A supporting system of this kind permits of testing shafts or rotors of all kinds and sizes.

On each pedestal 24, 25, there is disposed, for instance, a system including a support 14 and a quartz Q, as above described, arranged for cooperation with other elements of a balancing apparatus described above in connection with Fig. 1.

According to another feature of the present invention, I provide means such that, when it is desired to balance electric machines, it is possible, not only to proceed to a dynamic balancing, as above explained, but also to observe cyclic irregularities of the magnetic or electric fields of said machines.

For this purpose, according to the present invention, supposing for instance that the apparatus is of the kind of that described with reference to Figs. 5 to 8, it suffices to mount rotor 13 on the inside of its stator 33 supported by a suitable carriage 34.

It will be readily understood that, with such an arrangement, having previously obtained the mechanical balance adjustment of the whole of shaft 5 and rotor 13, it is possible to proceed to the electric balancing by electrically driving said rotor. The eventual irregularities of the rotor and stator fields will be detected by mechanical forces which will be recorded by piezo-electric devices Q.

Such an arrangement permits of remedying the irregularities of the coils, the variations of the air gaps, and so on.

According to still another feature of the present invention, I combine machines of any kind whatever (such as motors of all types, electric machines and the like) with any of the above specified measurement or detection devices in such manner that it is possible to exert at any time, during the working of said machines, a supervision of the balance conditions thereof.

It will suffice, for this purpose, to arrange the bearings of said machines in such manner that they permit of transmitting, to the piezo-electric devices, the components P of the reactions produced by unbalanced masses, and especially in the manner above set forth with reference to Figs. 5 and 6.

Figure 10:
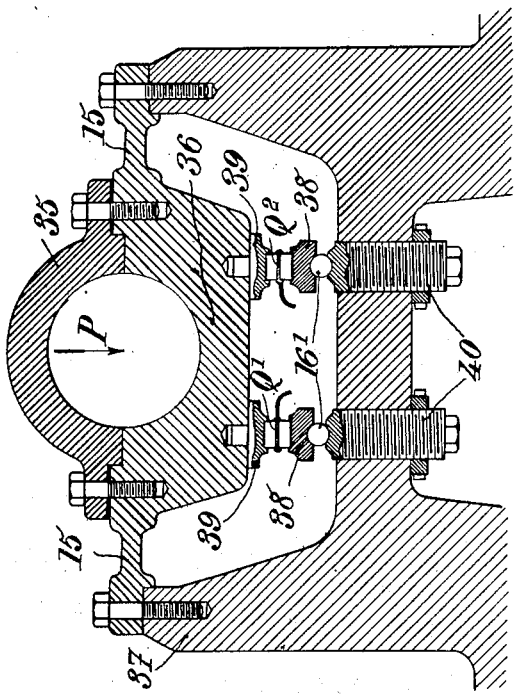
Fig. 10 shows the combination of a motor or engine (only the frame of which is shown) and of means, according to the present invention, for recording the lack of balance thereof, the whole being made according to the invention.
Figure 9:
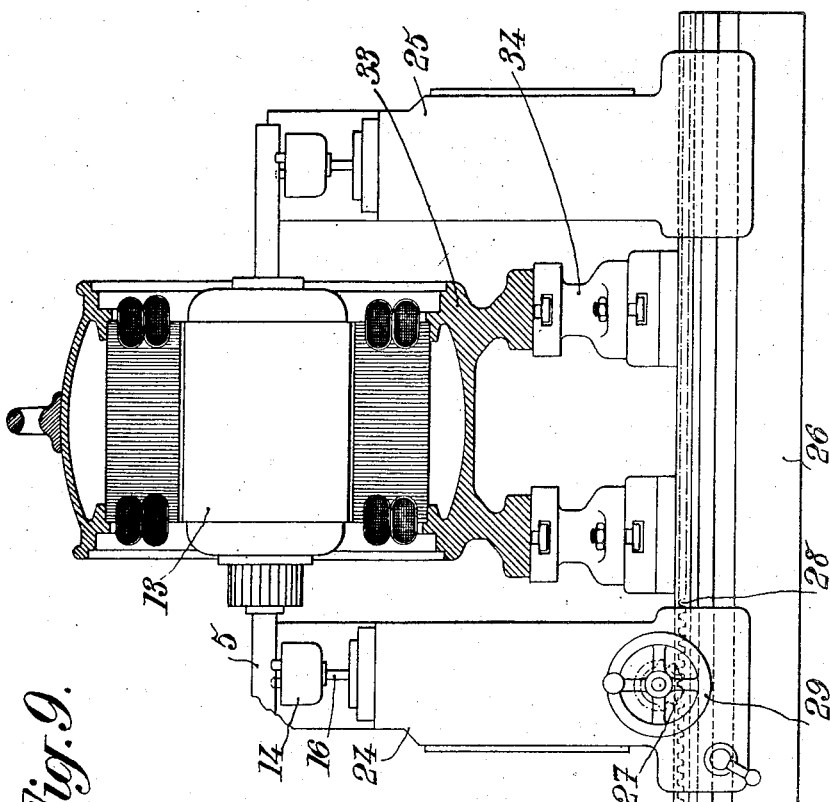
Fig. 9 is an elevational view of the whole of a balancing apparatus of the kind of that illustrated by Figs. 7 and 8, including means for detecting the defects of electrical balancing, made according to the invention.

In Fig. 10 of the drawings, I have shown a bearing of this kind which comprises, for instance, a flexible connection 15 between, on the one hand, said bearing 35, 36, and, on the other hand, the frame 37 of the machine to be balanced. The piezo-electric device (which in the embodiment illustrated by Fig. 10 includes two crystals $Q_1$ and $Q_2$) is inserted between the metallic supports 38 and 39, the whole being held in position and tightly secured by means of suitable means such as jacks 40.

In order to ensure the correct transmission of component P, I may provide means such as those already stated above and which are constituted, in Fig. 10, by means of balls or spheres $16^1$.

It will be readily understood that such a system permits of checking, when so desired, the balancing of the machine, without necessitating the taking to pieces of the rotor and without requiring any special balancing apparatus.

According to another feature of the present invention, I provide means for eliminating the effect of parasitic vibrations.

Such means are shown in Fig. 11 of the drawings.

The device illustrated by this figure is of the same general arrangement as above described. In particular, the shaft 5 to be balanced is carried by rollers 22, 23 mounted on a support 14 elastically connected at 15 to frame 24. The vertical components due to the weight and the action of an unbalanced mass are then transmitted to piezo-electric device $Q_1$, housed in a box 18, through a kind of leg 16. The current that is created is transmitted to an electron tube.

It has been found that, in such a system, when the speed exceeds a given value, microvibrations take place, which are due, in particular, to the fact that the contacting surfaces of rollers 22, 23 are not exactly of geometrical shape.

These vibrations are for instance of a frequency ranging from 1,500 to 2,000 cycles per second. Their effect is to modify the electromotive force curve generated by crystal $Q^1$ in the manner indicated by Fig. 12. In this figure, the top curve represents the shape of the vibrations in the absence of microvibrations and the middle curve shows the shape of these microvibrations, the lower curve showing the superposition of the two, that is to say the curve corresponding to the phenomenon that in fact occurs.

This may correspond, in some cases, to disturbances, when the readings are to be very accurate.

Therefore, according to the present invention, I provide means for eliminating the parasitic vibrations in question, or at least compensating their effects.

I might, for instance, replace rollers 22, 23 by smooth bearings. As a matter of fact, the sliding of a shaft on an oil film, in a well adjusted bearing takes place practically without vibration.

It is preferred, according to the present invention, to accomplish this result by providing an electric compensation, in particular by means of several quartz elements or several piezo-electric devices the electromotive forces of which produced by the micro-vibrations, tend mutually to compensate one another.

For instance, it suffices, in order to obtain this result, to combine with the first crystal $Q_1$ a second crystal $Q^2$, and to connect them electrically in a suitable manner.

In particular, this second quartz element may be secured against the bottom of cup or box 18 through means including, for instance, an accelerometric mass 50 subjected, preferably at the center of gravity, to the action of a spring 51, through a rod 52. This spring is interposed between said element 52 and a stirrup-shaped member 53 through rods 54 fixed to the cup-shaped part and on which mass 50 is freely mounted.

It is obvious that the quartz element $Q^2$ is not subjected in any way to the unbalance forces acting on the element $Q^1$, since body 18 is substantially rigid. On the other hand, microvibrations which affect the whole machine will cause forces to be exerted on both crystals, and thus will produce electrical impulses from each quartz element. Thus the second quartz element produces electric tensions equivalent to those produced by quartz element $Q^1$. If now, the elements are arranged in such manner as to have their polarities inversely related, I obtain, in a particularly simple manner, the electric compensation of the respective charges corresponding to the micro-vibrations.

However, account should be taken that these charges, of opposed signs, although equal, are, as a rule, produced with a slight time lag with respect to each other, due to the fact that the speed of propagation of the mechanical deformation is different from that of electricity along a conductor.

It is therefore advantageous to combine with the system above described, any suitable means for obviating this time lag.

For instance, as shown by the drawings, I make use of a reactance coil I interposed between the two quartz elements and calculated in such manner that the lag in the electric flow therethrough is equivalent to the distance through which the mechanical wave has to move. I might also make use of any other suitable means for accomplishing this result.

Whatever be the specific arrangement that is chosen, I obtain a system which wholly eliminates the effects of micro-vibrations.

According to another feature of the invention, I combine, with a device for recording the presence and position of unbalanced masses, means for inscribing, on the piece to be studied itself, signs which determine the position of said masses, which eliminates any possibility of error of the operator.

For this purpose, according to my invention, said marking means (which may be of any suitable type) must be capable of automatically coming into action for predetermined positions of the whole system, which positions are recorded by the recording device of the system.

If this recording device makes it possible, as above described, to determine the time at which the force produced by the unbalanced mass passes through its maximum value, that is to say that the time at which said unbalanced mass is in a vertical radial plane, it is sufficient to provide marking means capable of tracing, at a given time, a mark on a portion of the generatrix located at the intersection with this plane.

According to a particularly simple embodiment, said marking means utilize the flow of an electric current producing sparks which mark the metal at the desired place, the whole being, for instance arranged as shown by Figs. 13 to 16.

As above explained, the angular position of the unbalanced mass in a shaft or the like may be determined by producing a spark between points 9 and 9', on the one hand, carried by a stationary, but adjustable, part 10, and, on the other hand, a point 8 carried by the shaft 5 to be studied, this spark producing a transverse signal on the screen of the cathode ray oscillograph.

The intensity of the electric current at the time of the discharge is high and it can consequently be utilized for marking the shaft.

For this purpose, according to the arrangement of Figs. 13 to 16, the discharge current is no longer allowed to flow directly through the machine which is being studied. As a matter of fact, the direct flow of this discharge current through the machine involved some disadvantages; in particular it damaged the surfaces of rollers 22, 23, by formation of sparks. In the present embodiment, I make use of means for shunting the discharge current, by causing it first to pass through a vertical plane located in coincidence with the axis of shaft 5, and by producing sparks along a portion of the generatrix of the shaft located in this plane. If the adjustable element 10 has been previously brought into a position such (by observation in the oscillograph or through any other means) that the sparks are produced when the unbalanced mass $m$ passes through this vertical plane V, the sparks perform a correct marking of piece 5 at $s$ (Fig. 16), at the intersection of this plane and of the contact member which causes the formation of sparks on said piece 5.

The above mentioned device for shunting the discharge current includes, for instance, a deformable structure D (Fig. 13) supporting a contact member, such as a brass blade 55, adapted to be brought into contact with shaft 5, for instance transversely thereto, in such manner that the width of said blade determines the length of mark $s$.

This structure D, which is carried by an insulating support 56 (the whole being diagrammatically shown by Fig. 13) is then electrically connected, through flexible braids 57 and a return conductor 58, to the pole of the oscillatory system opposed to that directly connected to contact parts 9 and 9'.

This oscillatory system is shown on the left hand side of Fig. 13. It includes, for instance, a feed device with a transformer 59 and rectifiers 60 and a capacity circuit $C_1$, $C_2$, L R.

The middle point of the transformer is connected to the deformable structure D, through conductor 58. A resistance $R_1$ of say about one thousand ohms, keeps the negative terminal of the high tension portion at zero potential. Furthermore, it constitutes an important obstacle to the passage of the sparking current through the base of the machine.

Concerning the deformable system D, it is advantageously made, as shown in detail by Figs. 14 and 15, in the form of a parallellogram 61, 62, 63, 64 supporting blade 55.

This parallellogram is preferably retractable, and in particular, it can be pivoted out of the way, so as not to interfere with the operations to be performed before and after a test. For this purpose, element 62 thereof, rigid with a shaft 65, is pivotable. Normally, element 62 is kept in the vertical position shown by the action of a spring 66 connected to a screw 69 mounted in a member also rigid with shaft 65. A screw 67 carried by an arm likewise rigid with shaft 65 engages on a fixed plate 68 and thus limits the clockwise (Fig. 14) movement of element 62. As spring 66 is fixed to screw 69 eccentrically with respect to the axis of shaft 65, it also maintains the structure in the inactive pivoted position, in which the line joining screw 69 and the fixed end of spring 66 passes to the other side of the axis of shaft 65. A weak spring 70 is provided, between a piece 71 and arm 63, so as to tend to apply blade 55 against the shaft which is being studied. Finally, the whole of the parallellogram can be displaced coaxially with respect to shaft 65, with a screw 72 for fixing it in any desired position of use.

A device of this kind does not call for any adjustment of contact piece 55, the direction of which is determined once and for all. On the other hand, the disengagement of piece 5 is produced by the mere pivoting of lever 62.

Thus, I obtain a marking device which works in the following manner:

A discharge takes place every time needle 8 comes opposite one of the contacts 9 and 9'. The electric current flows through the spark produced at this point, then along shaft 5. Then it passes, at s, into contact piece 55, again with the formation of sparks, and it returns, through conductors 57 and 58 to the negative terminal of the system. As a matter of fact, very little current flows through the machine.

The operator, in these conditions, first adjusts the position of contacts 9 and 9', until this position corresponds to the discharge taking place when the unbalanced mass m passes through the vertical plane V (Fig. 16). This is indicated by the oscillograph, in the manner above explained and illustrated, in particular, by Fig. 4, by the fact that the two transverse lines B coincide with the ends of line A, which indicates the amplitude of the periodic force due to the unbalanced mass.

At this time, the operator causes the sparking means to work for a certain time. The successive sparks passing between a generatrix (Fig. 16) of shaft 5 and blade 55, forms a short mark s located on a generatrix and the width of which is equal to the width of said blade 55.

Of course, two such marks are traced in opposed diametral respective positions, if there are two contacts 9 and 9', as shown by the drawings, and especially Fig. 13.

Finally, with the device according to my invention, as above described, I obtain a marking which is fully reliable, because it is automatic and independent of the action of the operator who is employing the device.

In a general manner, while I have, in the above description, disclosed what I deem to be practical and efficient embodiments of the present invention, it should be well understood that I do not wish to be limited thereto as there might be changes made in the arrangement, disposition, and form of the parts without departing from the principle of the present invention as comprehended within the scope of the appended claims.

What I claim is:

1. Device for determining periodic unbalance forces of a body rotating about an axis at a point along such axis, comprising means to transform such forces into corresponding electric impulses, a cathode ray tube, means to transmit said impulses to said tube in such a manner as to produce corresponding deviations of the ray thereof proportional to the force, means to transmit to said tube in synchronism with the revolution of said body a periodic signal having a relatively short duration compared to the time of rotation of said body, said tube having means responsive to such signal to indicate the amount of deviation of the ray when a given point on the body occupies a predetermined angular position, said signal transmitting means being displaceable angularly around the axis of rotation to vary the angular position at which said signal is transmitted, said signal transmitting means including at least two elements arranged to establish a circuit connection for each rotation of said body, one of said elements being mounted on the rotating body, the other of said elements being mounted for angular adjustment around the axis of rotation of said body, and a condenser having a constant connection to a source of current and to said second element so as to discharge when said elements establish said circuit connection.

2. In an arrangement for determining the principal vibrations of a body which during operation is subjected also to parasitic vibrations, piezo-electric mechanism comprising two piezoelectric elements, means to transmit to one of said elements both the principal and the parasitic vibrations, and to the other element the parasitic vibrations only, and operating means so combining the output of said elements that the effects of the parasitic vibrations on the two elements compensate each other.

3. A device as claimed in claim 2 in which the means for transmitting the parasitic vibrations only to the second element includes a member subjected to both such vibrations, an eccelerometric mass elastically connected to said member, and means to transmit the forces exerted on said mass to said second element.

4. In an arrangement for determining the principal vibrations of a body which during operation is subjected also to parasitic vibrations, a support, means mounting the body for movement with respect to the support, such movement constituting the principal vibrations, said support being subjected to said parasitic vibrations, a first piezo-electric element rigid with said support, means to transmit to said first piezo-electric element movements of said body, with respect to the support, a second piezo-electric element, an accelerometric mass movably mounted on said support, a spring arranged between said mass and said support, means to transmit movements of said mass to said second piezo-electric element, and means so combining the output of said elements that the effects of the parasitic vibrations on the two elements compensate each other.

5. In a device as claimed in claim 2, said last means including an electric circuit connected to said piezo-electric elements, and a reactance in said circuit between said elements so dimensioned that the lag in current flow between said elements equals the time required by the parasitic vibration wave to traverse the space between the two piezo-electric elements.

6. Device for determining periodic unbalance forces of a body rotating about an axis at a point along such axis, comprising means to transform such forces into corresponding electric impulses, a cathode ray tube, means to transmit said impulses to said tube in such a manner as to produce corresponding deviations of the ray thereof to form on said screen a luminous trace of a length proportional to the force, means to transmit to said tube in synchronism with the revolution of said body a periodic signal having a relatively short duration compared to the time of rotation of said body, said last means producing deflection of the ray at an angle to the deviation thereof when a given point on the body occupies a predetermined angular position, said last means being displaceable angularly around the axis of rotation to vary the angular position at which said signal is transmitted, said signal transmitting means including at least two elements arranged to establish a circuit connection for each rotation of said body, one of said elements being mounted on the rotating body, the other of said elements being mounted for angular adjustment around the axis of rotation of said body, and a condenser having a constant connection to a source of current and to said second element so as to discharge when said elements establish said circuit connection.

7. A device for determining periodic unbalance forces of a body rotating about an axis at a point along said axis, comprising a frame, a fixed, substantially incompressible pick-up member sensitive to variation in force thereon carried by said frame, a support for said rotating body, means mounting said support on said frame extending laterally between and operatively connecting said support and said frame so as to prevent lateral movement of the support with respect to the frame, said mounting means being insufficient to prevent vertical movement of the support under the weight of the rotating body and the unbalance forces acting thereon, incompressible means interposed between said pick-up member and said support for transmitting unbalance forces from said support to said member and preventing vertical downward movement of the support, said pick-up member transforming unbalance forces into corresponding electric impulses, a cathode ray tube having a screen, means to transmit said impulses to said tube in such a manner as to produce corresponding deviations of the ray thereof to form on said screen a luminous trace of a length proportional to the force, means to transmit to said tube in synchronism with the revolution of said body a periodic signal having a relatively short duration compared to the time of rotation of said body, said last means producing deflection of the ray at an angle to the deviation thereof when a given point on the body occupies a predetermined angular position, said last means being displaceable angularly around the axis of rotation to vary the angular position at which said signal is transmitted.

8. In a device for determining periodic unbalance of a body rotating about an axis at a point along said axis, a frame, a fixed, substantially incompressible pick-up member sensitive to variations in force thereon carried by said frame directly below said axis, a support for said rotating body, means mounting said support on said frame extending laterally between and operatively connecting said support and said frame so as to prevent lateral movement of the support with respect to the frame, said mounting means being insufficient to prevent vertical movement of the support under the weight of the rotating body and the unbalance forces acting thereon, and incompressible means interposed between said pick-up member and said support for transmitting unbalance forces from said support to said member in a straight line intersecting said axis and preventing vertical downward movement of the support.

9. In a device according to claim 8, said pick-up member including a piezo-electric element, said force transmitting means including a pin-like element having ends engaging the support and the piezo-electric element in a point contact, the axis of said pin being vertical and intersecting the shaft axis.

10. In a device for determining periodic unbalance forces of a body rotating about an axis at a point along said axis, means for determining the angular position of a radial plane containing an unbalancing mass, and means settable to produce a spark to the surface of the body at a point in the radial plane of such mass, said last means including a circuit having at least two circuit making and breaking elements one of which is carried by the body for rotation therewith, and another of which is mounted for angular adjustment around the axis of rotation of the body, to produce a signal in said circuit at least once in each revolution of the body, said circuit further including an electrode located close to the surface of the rotating body.

11. In a device according to claim 10, a deformable system for supporting said electrode alternatively in active position close to said body and in inactive position remote from said body.

12. A device for determining periodic unbalance forces of a body rotating about an axis at a point along said axis comprising a frame, a fixed substantially incompressible pick-up member sensitive to variation in force thereon carried by said frame, a support for said rotating body, means extending laterally between and operatively connecting said support and said frame to mount said support on said frame and to prevent lateral movement of the support with respect to the same, and incompressible means interposed between said support and member for transmitting unbalance forces from said support to said member and preventing downward vertical movement of the support with respect to the frame.

13. A device for determining periodic unbalance forces of a body rotating about an axis at a point along said axis comprising a frame, a fixed substantially incompressible pick-up member sensitive to variation in force thereon carried by said frame, a support for said rotating body, means extending laterally between and operatively connecting said support and said frame to mount said support on said frame and to prevent lateral movement of the support with respect to same, said mounting means acting substantially in the line of the axis of a body carried by said support to prevent lateral movement, and incompressible means interposed between said support and member for transmitting unbalance forces from said support to said member and preventing downward vertical movement of the support with respect to the frame.

14. In a device for determining periodic unbalance of a body rotating about an axis at a point along said axis, a pick-up member sensitive to variations in force thereon, a pressure member associated with said pick-up member, flexible means extending laterally connected to said pressure member for mounting the same, and means for transmitting unbalance forces to said pressure member in a line substantially perpendicular to said flexible means.

15. In a device for determining periodic unbalance of a body rotating about an axis at a point along said axis, a frame, a fixed, substantially incompressible pick-up member sensitive to variations in force thereon located on the frame below the axis, a pressure member above said pick-up member operatively associated therewith, flexible means extending laterally from said pressure member connected to said frame mounting said pressure member on said frame, and incompressible means supporting said rotating body from below and transmitting vertical unbalance forces from said body to said pressure member in a substantially vertical line.

16. In a device for determining periodic unbalance forces of a body rotating about an axis at a point along said axis, means mounting said body for rotation, a pick-up member sensitive to variations in force thereon, means to transmit to such pick-up member unbalance forces acting on said body in a vertical radial plane, means adjustable angularly around the body to determine the moment of each revolution when the radial plane containing the unbalance mass coincides with such vertical plane, means controlled by said adjustable means to produce a spark to the surface of the body at such moment in the vertical plane, and means to render such spark producing means operative.

17. In a device for determining periodic unbalance forces of a body rotating about an axis at a point along said axis, means including a circuit having at least two circuit making and breaking elements one of which is carried by the body for rotation therewith, and another of which is mounted for angular adjustment around the axis of rotation of the body, to produce a signal in said circuit at least once in each revolution of the body, mechanism including said means to determine the angular relation of the radial plane of the body containing the unbalance to a predetermined fixed radial plane, a second circuit including said elements and an electrode adapted to be mounted close to the surface of the body in a radial plane having a fixed angular relation to such first fixed radial plane to produce a spark to the surface of said body, and means to render such second circuit operative.

18. In a device for determining periodic unbalance forces of a body rotating about an axis at a point along said axis, means including a circuit having at least two circuit making and breaking elements one of which is carried by the body for rotation therewith, and another of which is mounted for angular adjustment around the axis of rotation of the body, to produce a signal in said circuit at least once in each revolution of the body, mechanism including said means to determine the angular relation of the radial plane of the body containing the unbalance to a predetermined fixed radial plane, a second circuit including said elements and an electrode adapted to be mounted close to the surface of the body in a radial plane having a fixed angular relation to such first fixed radial plane to produce a spark to the surface of said body, and a deformable system for supporting said electrode alternatively in active position close to said body and in inactive position remote from said body.

19. In an arrangement for dynamically balancing a rotating body having an unbalancing region: a substantially rigid bed structure; supporting means comprising at least one substantially rigid supporting structure extending from said bed structure and having a bearing structure engaging a rotating portion of said body for rotatably supporting said body so as to substantially prevent vibratory motion of the bearing structure under the action of the periodic unbalance forces exerted thereon during rotation of said body; at least one substantially rigid mechano-electric transducing structure forming part of said supporting structure and so held interposed in a substantially stationary position under pressure between said bearing member and said bed structure as to be subjected to the cyclical transducer-actuating unbalance forces transmitted by said body to said bed structure in the direction of said transducing structure and produce corresponding periodical unbalance potential cycles while remaining substantially stationary; said supporting means including elements extending laterally between said bearing structure and portions of said supporting structure and laterally relatively to the direction of said unbalance forces transmitted by said bearing structure to said transducing element for preventing movement of said bearing structure in a direction lateral to the direction of the transducer-actuating unbalance forces while permitting said unbalance forces to be exerted on said transducing structure; said supporting structure including substantially rigid means interposed between said bearing structure and said transducing structure for transmitting unbalance forces from said bearing structure to said transducing structure while substantially preventing movement of said bearing structure with respect to the bed structure; a rotary reference element forming a limited area element of said rotating body; reference response means including a relatively stationary reference element cooperating with said rotary reference element and electric circuit means for periodically producing reference potential pulses at the moments said rotary reference element moves past a position determined by the location of said stationary reference element; electrically controlled operating means including unbalance locating means for determining unbalancing characteristics of said body; said operating means including an electronic ray tube having a first pair of electrodes for deflecting an electronic ray to produce a trace in one direction, and a second pair of electrodes subjected to potentials corresponding to said reference potentials for deflecting the electronic ray to produce a trace in a direction generally transverse thereto; and circuit means for impressing potentials corresponding to the unbalance potentials on one pair of the control electrodes and for impressing potentials corresponding to said reference potentials on the other pair of said control electrodes; said reference element and the elements of said reference response means and said unbalance response means being so designed and correlated that the duration of reference potential pulse is sufficiently shorter than the duration of unbalance potential cycle and that the ray deflection caused by the reference potential pulse produces a trace which has substantially a negligible effect on a trace produced by the ray deflection caused by the unbalance potential so that the overall ray deflection caused by said two potentials produces two visibly segregated intersecting traces.

20. In an arrangement for dynamically balancing a rotating body having an unbalancing region: supporting means including a substantially rigid base structure and at least one substantially rigid supporting structure extending from said base structure and having a bearing structure engaging a rotating portion of said body for rotatably supporting said body; at least one substantially rigid mechano-electric transducing structure forming part of said supporting structure and so held interposed in a substantially stationary position under pressure between said bearing member and said base structure as to be subjected to the cyclical transducer-actuating unbalance forces transmitted by said body to said base structure in the direction of said transducing structure and produce corresponding periodical unbalance potential cycles while remaining substantially stationary; the structural elements of said supporting means and of the transducer structure forming part thereof being of such rigidity that they form with said rotary body a system which has a resonance frequency of a sufficiently higher order than the frequency of said unbalance forces so as to substantially prevent vibratory motion of the bearing structure under the action of said unbalance forces; said supporting means including elements extending between said bearing structure and portions of said supporting structure and in a lateral direction relatively to the direction of said transducer-actuating unbalance forces for preventing movement of said bearing structure in said lateral direction while permitting said unbalance forces to be exerted on said transducing structure; said supporting structure including substantially rigid means interposed between said bearing structure and said transducing structure for transmitting unbalance forces from said bearing structure to said transducing structure while substantially preventing movement of said bearing structure with respect to the base structure; and electrically controlled operating means including a control circuit system operated under the control of said unbalance potential for determining characteristics of the unbalancing region of said body.

21. In an arrangement for dynamically balancing a rotating body having an unbalancing region: supporting means including a substantially rigid base structure and at least one substantially rigid supporting structure extending from said base structure and having a bearing structure engaging a rotating portion of said body for rotatably supporting said body; at least one substantially rigid mechano-electric transducing structure forming part of said supporting structure and so held interposed in a substantially stationary position under pressure between said bearing member and said base structure as to be subjected to the cyclical transducer-actuating unbalance forces transmitted by said body to said base structure in the direction of said transducing structure and produce corresponding periodical unbalance potential cycles while remaining substantially stationary; the structural elements of said supporting means and of the transducer structure forming part thereof being of such rigidity that they form with said rotary body a system which has a resonance frequency of a sufficiently higher order than the frequency of said unbalance forces so as to substantially prevent vibratory motion of the bearing structure under the action of said unbalance forces; said supporting means including elements extending between said bearing structure and portions of said supporting structure and in a lateral direction relatively to the direction of said transducer-actuating unbalance forces for preventing movement of said bearing structure in said lateral direction while permitting said unbalance forces to be exerted on said transducing structure; said supporting structure including substantially rigid means interposed between said bearing structure and said transducing structure for transmitting unbalance forces from said bearing structure to said transducing structure while substantially preventing movement of said bearing structure with respect to the bed structure; a rotary reference element forming a limited area element of said rotating body; a relatively stationary reference element cooperating with said rotary reference element and electric circuit means for periodically producing reference potential pulses at the moments said rotary reference element moves past a position determined by the location of said stationary reference element; and electrically controlled operating means including a control circuit system operated under the control of said unbalance potential and said reference potential for determining characteristics of the unbalancing region of said body.

22. In an arrangement for dynamically balancing a rotating body having an unbalancing region: supporting means including a substantially rigid base structure and at least one substantially rigid supporting structure extending from said base structure and having a bearing structure engaging a rotating portion of said body for rotatably supporting said body; at least one substantially rigid mechano-electro transducing structure forming part of said supporting structure and so held interposed in a substantially stationary position under pressure between said bearing member and said base structure as to be subjected to the cyclical transducer-actuating unbalance forces transmitted by said body to said base structure in the direction of said transducing structure and produce corresponding periodical unbalance potential cycles while remaining substantially stationary; the structural elements of said supporting means and of the transducer structure forming part thereof being of such rigidity that they form with said rotary body a system which has a resonance frequency of a sufficiently higher order than the frequency of said unbalance forces so as to substantially prevent vibratory motion of the bearing structure under the action of said unbalance forces; said supporting means including elements extending between said bearing structure and portions of said supporting structure and in a lateral direction relatively to the direction of said transducer-actuating unbalance forces for preventing movement of said bearing structure in said lateral direction while permitting said unbalance forces to be exerted on said transducing structure; said supporting structure including substantially rigid means interposed between said bearing structure and said transducing structure for transmitting unbalance forces from said bearing structure to said transducing structure while substantially preventing movement of said bearing structure with respect to the bed structure; a rotary reference element forming a limited area element of said rotating body; a relatively stationary reference element cooperating with said rotary reference element and electric circuit means for periodically producing reference potential pulses at the moments said rotary reference element moves past a position determined by the location of said stationary reference element; and electrically controlled operating means including a control circuit system operated under the control of said unbalance potential and said reference potential for producing an electric discharge at the unbalance region of said body.

23. In an arrangement for dynamically balancing a rotating body having an unbalancing region: supporting means including a substantially rigid base structure and at least one substantially rigid supporting structure extending from said base structure and having a bearing structure engaging a rotating portion of said body for rotatably supporting said body; at least one substantially rigid mechano-electric transducing structure forming part of said supporting structure and so held interposed in a substantially stationary position under pressure between said bearing member and said base structure as to be subjected to the cyclical transducer-actuating unbalance forces transmitted by said body to said base structure in the direction of said transducing structure and produce corresponding periodical unbalance potential cycles while remaining substantially stationary; the structural elements of said supporting means and of the transducer structure forming part thereof being of such rigidity that they form with said rotary body a system which has a resonance frequency of a sufficiently higher order than the frequency of said unbalance forces so as to substantially prevent vibratory motion of the bearing structure under the action of said unbalance forces; said supporting means including elements extending between said bearing structure and portions of said supporting structure and in a lateral direction relatively to the direction of said transducer-actuating unbalance forces for preventing movement of said bearing structure in said lateral direction while permitting said unbalance forces to be exerted on said transducing structure; said supporting structure including substantially rigid means interposed between said bearing structure and said transducing structure for transmitting unbalance forces from said bearing structure to said transducing structure while substantially preventing movement of said bearing structure with respect to the bed structure; a rotary reference element forming a limited area element of said rotating body; a relatively stationary reference element cooperating with said rotary reference element and electric circuit means for periodically producing reference potential pulses at the moments said rotary reference element moves past a position determined by the location of said stationary reference element; and electrically controlled operating means including a control circuit system operated under the control of said unbalance potential and said reference potential for producing a visible indication of unbalancing characteristics of said body.

24. In an arrangement for dynamically balancing a rotating body having an unbalancing region: supporting means including a substantially rigid base structure and at least one substantially rigid supporting structure extending from said base structure and having a bearing structure engaging a rotating portion of said body for rotatably supporting said body; at least one substantially rigid mechano-electric transducing structure forming part of said supporting structure and so held interposed in a substantially stationary position under pressure between said bearing member and said base structure as to be subjected to the cyclical transducer-actuating unbalance forces transmitted by said body to said base structure in the direction of said transducing structure and produce corresponding periodical unbalance potential cycles while remaining substantially stationary; the structural elements of said supporting means and of the transducer structure forming part thereof being of such rigidity that they form with said rotary body a system which has a resonance frequency of a sufficiently higher order than the frequency of said unbalance forces so as to substantially prevent vibratory motion of the bearing structure under the action of said unbalance forces; said supporting means including elements extending between said bearing structure and portions of said supporting structure and in a lateral direction relatively to the direction of said transducer-actuating unbalance forces for preventing movement of said bearing structure in said lateral direction while permitting said unbalance forces to be exerted on said transducing structure; said supporting structure including substantially rigid means interposed between said bearing structure and said transducing structure for transmitting unbalance forces from said bearing structure to said transducing structure while substantially preventing movement of said bearing structure with respect to the bed structure; a rotary reference element forming a limited area element of said rotating body; an angularly-adjustable relatively stationary reference element cooperating with said rotary reference element and electric circuit means for periodically producing reference potential pulses at the moments said rotary reference element moves past a position determined by the location of said stationary reference element; and electrically controlled operating means including a control circuit system operated under the control of said unbalance potential and said reference potential for producing an electric discharge at the unbalancing region of said body.

25. In an arrangement for dynamically balancing a rotating body having an unbalancing region: supporting means including a substantially rigid base structure and at least one substantially rigid supporting structure extending from said base structure and having a bearing structure engaging a rotating portion of said body for rotatably supporting said body; at least one substantially rigid mechano-electric transducing structure forming part of said supporting structure and so held interposed in a substantially stationary position under pressure between said bearing member and said base structure as to be subjected to the cyclical transducer-actuating unbalance forces transmitted by said body to said base structure in the direction of said transducing structure and produce corresponding periodical unbalance potential cycles while remaining substantially stationary; the structural elements of said supporting means and of the transducer structure forming part thereof being of such rigidity that they form with said rotary body a system which has a resonance frequency of a sufficiently higher order than the frequency of said unbalance forces so as to substantially prevent vibratory motion of the bearing structure under the action of said unbalance forces; said supporting means including elements extending between said bearing structure and portions of said supporting structure and in a lateral direction relatively to the direction of said transducer-actuating unbalance forces for preventing movement of said bearing structure in said lateral direction while permitting said unbalance forces to be exerted on said transducing structure; said supporting structure including substantially rigid means interposed between said bearing structure and said transducing structure for transmitting unbalance forces from said bearing structure to said transducing structure while substantially preventing movement of said bearing structure with respect to the bed structure; a rotary reference element forming a limited area element of said rotating body; an angularly-adjustable relatively stationary reference element cooperating with said rotary reference element and electric circuit means for periodically producing reference potential pulses at the moments said rotary reference element moves past a position determined by the location of said stationary reference element; and electrically controlled operating means including a control circuit system operated under the control of said unbalance potential and said reference potential for producing a visible indication of unbalancing characteristics of said body.

26. In an arrangement for dynamically balancing a rotating body having an unbalancing region: supporting means including a substantially rigid base structure and at least one substantially rigid supporting structure extending from said base structure and having a bearing structure engaging a rotating portion of said body for rotatably supporting said body; at least one substantially rigid mechano-electric transducing structure forming part of said supporting structure and so held interposed in a substantially stationary position under pressure between said bearing member and said base structure as to be subjected to the cyclical transducer-actuating unbalance forces transmitted by said body to said base structure in the direction of said transducing structure and produce corresponding periodical unbalance potential cycles while remaining substantially stationary; the structural elements of said supporting means and of the transducer structure forming part thereof being of such rigidity that they form with said rotary body a system which has a resonance frequency of a sufficiently higher order than the frequency of said unbalance forces so as to substantially prevent vibratory motion of the bearing structure under the action of said unbalance forces; said supporting means including elements extending between said bearing structure and portions of said supporting structure and in a lateral direction relatively to the direction of said transducer-actuating unbalance forces for preventing movement of said bearing structure in said lateral direction while permitting said unbalance forces to be exerted on said transducing structure; said supporting structure including substantially rigid means interposed between said bearing structure and said transducing structure for transmitting unbalance forces from said bearing structure to said transducing structure while substantially preventing movement of said bearing structure with respect to the bed structure; and electrically controlled operating means including a control circuit system operated under the control of said unbalance potential for determining characteristics of the unbalancing region of said body.

AUGUSTE LOUIS MARIE ANTOINE ROUY.